Patented May 16, 1933

1,909,638

UNITED STATES PATENT OFFICE

ROBERT E. SCHMIDT, OF ELBERFELD, BERTHOLD STEIN, OF MANNHEIM, AND KURT BAMGERGER, OF ELBERFELD, GERMANY, ASSIGNORS TO I. G. FARBENINDUSTRIE AKTIENGESELLSCHAFT, OF FRANKFORT-ON-THE-MAIN, GERMANY

MANUFACTURE OF 1.4.1'.4'-TETRAHYDROXY-2.2'-DIANTHRAQUINONYL

No Drawing. Application filed September 15, 1930, Serial No. 482,156, and in Germany September 21, 1929.

The present invention relates to the manufacture of 1.4.1'.4'-tetrahydroxy-2.2'.-dianthraquinonyl.

The British Specification No. 10,074/03 describes as substance A a product obtained in addition to substance B by heating quinizarine with weakly alkaline salt solutions to temperatures exceeding 100° C. The statement of R. Scholl and co-workers (Berichte der Deutschen Chemischen Gesellschaft 52, (1919) page 2254) to the effect that substance A is not uniform but a mixture of quinizarine and substance B, has been found by our subsequent investigations to be incorrect. The statements of the Specification No. 10,074/03 are on the contrary entirely accurate. It has been established that the substance A is 1.4.1'.4'-tetrahydroxy-2.2'-dianthraquinonyl, while the substance B is a furane derivative, namely 1.4.4'-trihydroxy-2.2'-dianthraquinonyl-3.1'-oxide.

In accordance with the present invention the substance A is obtained in a very convenient manner, in an excellent purity and in a very satisfactory yield by causing a piperidine compound, that is, piperidine or a homologue or analogue thereof, such as N-methyl-, N-phenyl-, 2-methylpiperidine, hydrogenated quinolines containing a piperidine ring system etc., to act on quinizarine at ordinary or somewhat elevated temperature, for example, between about 30° and about 100° C. in the presence or absence of a diluent, such as methyl alcohol, ethyl alcohol, etc. This process has the advantage over that of the Specification No. 10,074/03 that it is possible to work without superatmospheric pressure and that substance A is produced in a much better yield and greater purity without the simultaneous formation of substance B.

The invention is illustrated by the following example, without being restricted thereto.

*Example.*—30 parts by weight of pure crystallized quinizarine are covered with 65 parts by weight of piperidine, whereupon a violet solution is immediately formed, which quickly solidifies to a thick crystalline magma consisting of the piperidine salt of quanizarine. 300 parts by weight of alcohol are then added with good stirring, when the mixture becomes again red due to the decomposition of the piperidine salt. Heating to 60-70° C. is then effected with occasional stirring. After a few hours the small red quinizarine crystals have disappeared and fine dark needles of tetrahydroxydianthraquinonyl are produced. The latter are filtered off with suction and washed with alcohol. The properties of the product thus obtainable correspond with those of the substance A described in the Specification No. 10,074/03.

We claim:

1. Process which comprises reacting upon quinizarine with a compound of the group consisting of piperidine and its homologues and analogues, until the quinizarine salt, being at first formed, has disappeared.

2. Process which comprises heating quinizarine with a compound of the group consisting of piperidine and its homologues and analogues to about 30° to about 100° C.

3. Process which comprises reacting upon quinizarine with piperidine, until the piperidine salt of quinizarine, being at first formed, has disappeared.

4. Process which comprises heating quinizarine with piperidine to about 30° to about 100° C.

5. Process which comprises heating quinizarine with piperidine to about 60° to about 70° C. in the presence of an alcohol.

In testimony whereof, we affix our signatures.

ROBERT E. SCHMIDT.
BERTHOLD STEIN.
KURT BAMBERGER.